(12) United States Patent
Stamenkovich

(10) Patent No.: US 12,737,909 B2
(45) Date of Patent: Sep. 15, 2026

(54) SYSTEMS AND METHODS FOR USING IMAGE DATA TO IDENTIFY LANE WIDTH

(71) Applicant: TORC Robotics, Inc., Blacksburg, VA (US)

(72) Inventor: Joseph Stamenkovich, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 406 days.

(21) Appl. No.: 18/339,831

(22) Filed: Jun. 22, 2023

(65) Prior Publication Data

US 2024/0104757 A1 Mar. 28, 2024

Related U.S. Application Data

(63) Continuation-in-part of application No. 18/303,460, filed on Apr. 19, 2023, now Pat. No. 12,597,271.

(Continued)

(51) Int. Cl.

| | |
|---|---|
| ***G06T 7/60*** | (2017.01) |
| ***G01C 21/00*** | (2006.01) |

(Continued)

(52) U.S. Cl.

CPC ............ *G06T 7/60* (2013.01); *G01C 21/3815* (2020.08); *G01C 21/3837* (2020.08);

(Continued)

(58) Field of Classification Search

CPC ............. G06T 7/60; G06T 2207/20081; G06T 2207/20084; G06T 2207/30256;

(Continued)

(56) References Cited

U.S. PATENT DOCUMENTS

| | | | |
|---|---|---|---|
| 11,403,774 | B2 | 8/2022 | Westmacott et al. |
| 11,443,531 | B1 | 9/2022 | Saggu et al. |

(Continued)

FOREIGN PATENT DOCUMENTS

| | | | | |
|---|---|---|---|---|
| CN | 114898310 A | | 8/2022 | |
| JP | 2017059003 A | * | 3/2017 | ........... G06V 20/588 |

(Continued)

OTHER PUBLICATIONS

Soomok Lee, Ego-lane index-aware vehicular localisation using the DeepRoad Network for urban environments, Jan. 4, 2021, Wiley, The Institution of Engineering and Technology (Year: 2021).

(Continued)

*Primary Examiner* — Vu Le
*Assistant Examiner* — Rachel Anne Ometz
(74) *Attorney, Agent, or Firm* — Armstrong Teasdale LLP

(57) ABSTRACT

A method, comprises identifying a set of image data captured by at least one autonomous vehicle when the at least one autonomous vehicle was positioned in a lane of a roadway, and respective ground truth localization data of the at least one autonomous vehicle; determining a plurality of lane width values for the set of image data; labeling the set of image data with the plurality of lane width values, the plurality of lane width values representing a width of a lane in which the at least one autonomous vehicle was positioned; and training using the labeled set of image data, a machine learning model, such that the machine learning model is configured to predict a new lane width value for a new lane as output.

20 Claims, 8 Drawing Sheets

Related U.S. Application Data

(60) Provisional application No. 63/447,766, filed on Feb. 23, 2023, provisional application No. 63/434,843, filed on Dec. 22, 2022, provisional application No. 63/376,860, filed on Sep. 23, 2022.

(51) Int. Cl.
*G06V 10/774* (2022.01)
*G06V 10/82* (2022.01)
*G06V 20/56* (2022.01)
*G06V 20/70* (2022.01)

(52) U.S. Cl.
CPC ............ *G06V 10/774* (2022.01); *G06V 10/82* (2022.01); *G06V 20/588* (2022.01); *G06V 20/70* (2022.01); *G06T 2207/20081* (2013.01); *G06T 2207/20084* (2013.01); *G06T 2207/30256* (2013.01)

(58) Field of Classification Search
CPC ............ G01C 21/3815; G01C 21/3837; G01C 21/3822; G01C 21/3848; G06V 10/774; G06V 10/82; G06V 20/588; G06V 20/70
See application file for complete search history.

(56) References Cited

U.S. PATENT DOCUMENTS 11,551,459 B1 1/2023 Saggu
11,645,839 B2 * 5/2023 Soni .................... G06V 20/182 382/159
11,738,770 B2 8/2023 Han et al.
2014/0303828 A1 10/2014 Joshi
2018/0189578 A1 7/2018 Yang et al.
2018/0307917 A1 * 10/2018 Mittal .................. G05D 1/0246
2020/0109952 A1 4/2020 Haque et al.
2020/0116499 A1 4/2020 Jung et al.
2020/0174487 A1 6/2020 Viswanathan et al.
2020/0219399 A1 * 7/2020 Pfeifle .................... G06N 3/045
2020/0272142 A1 8/2020 Beauvillain
2020/0324795 A1 * 10/2020 Bojarski ............. G05D 1/0274
2020/0341466 A1 * 10/2020 Pham .................. G06V 10/454
2021/0009163 A1 1/2021 Urtasun et al.
2021/0157330 A1 5/2021 Tran
2021/0179097 A1 6/2021 Pan et al.
2021/0224556 A1 7/2021 Xu et al.
2021/0237737 A1 8/2021 Al-Nuaimi et al.
2021/0237768 A1 * 8/2021 Tateishi .............. B60W 60/001
2021/0342600 A1 11/2021 Westmacott et al.
2022/0153315 A1 5/2022 Zeng et al.
2022/0180646 A1 6/2022 Halfaoui et al.
2022/0219700 A1 7/2022 Tsukamoto
2022/0374428 A1 11/2022 Nassar et al.
2023/0099494 A1 3/2023 Kocamaz et al.
2023/0101472 A1 3/2023 Colling et al.
2023/0122011 A1 4/2023 Ishimaru et al.
2023/0154206 A1 5/2023 Kim et al.
2023/0196913 A1 6/2023 Shnaider
2023/0298363 A1 * 9/2023 Zhang .................. B60W 40/06 382/103
2023/0347887 A1 11/2023 Favreau et al.
2023/0391358 A1 12/2023 Donderici
2024/0096109 A1 * 3/2024 Sharma ................ G06N 3/0464

FOREIGN PATENT DOCUMENTS

JP 2019194751 A 11/2019
WO 2021006870 A1 1/2021
WO 2022211927 A1 10/2022

OTHER PUBLICATIONS

Baoguo Yu, Ego-Lane Index Estimation Based on Lane-Level Map and LiDAR Road Boundary Detection, Oct. 27, 2021, M DPI, Sensors (Year: 2021).
Borkar, A Novel Lane Detection System With Efficient Ground Truth Generation, Dec. 8, 2011, IEEE, IEEE Transactions on Intelligent Transportation Systems vol. 13 No. 1 (Year: 2011).
Seo et al., "Tracking and estimation of ego-vehicle's state for lateral localization," 17th International IEEE Conference on Intelligent Transportation Systems (ITSC), Qingdao, China, 2014, pp. 1251-1257, doi: 10.1109/ITSC.2014.6957859. (Year: 2014).
Fujimoto et al., "LaneFusion: 3D Object Detection with Rasterized Lane Map," 2022 IEEE Intelligent Vehicles Symposium (IV), Aachen, Germany, 2022, pp. 396-403, doi: 10.1109/IV51971.2022.9827025. (Year: 2022).

* cited by examiner

400

Identify a set of image data captured by at least one autonomous vehicle when the at least one autonomous vehicle was positioned in a lane of a roadway, and respective ground truth localization data of the at least one autonomous vehicle. 410

↓

Determine lane width value. 420

↓

Label the set of image data with the plurality of lane width values, the plurality of lane width values representing a width of a lane in which the at least one autonomous vehicle was positioned. 430

↓

Train machine learning model for predicting lane width using new image data. 440

Identify a set of image data indicative of a field of view from an autonomous vehicle. 610

Execute trained machine learning model to generate a number of lanes within a roadway. 620

700

Identify a set of image data captured by at least one autonomous vehicle when the at least one autonomous vehicle was positioned in a lane of a roadway, and respective ground truth localization data of the at least one autonomous vehicle. 710

Determine a total number of lanes for the roadway. 720

Label the set of image data with the plurality of lane width values, the plurality of lane width values representing a width of a lane in which the at least one autonomous vehicle was positioned. 730

Train machine learning model for predicting lane width using new image data. 740

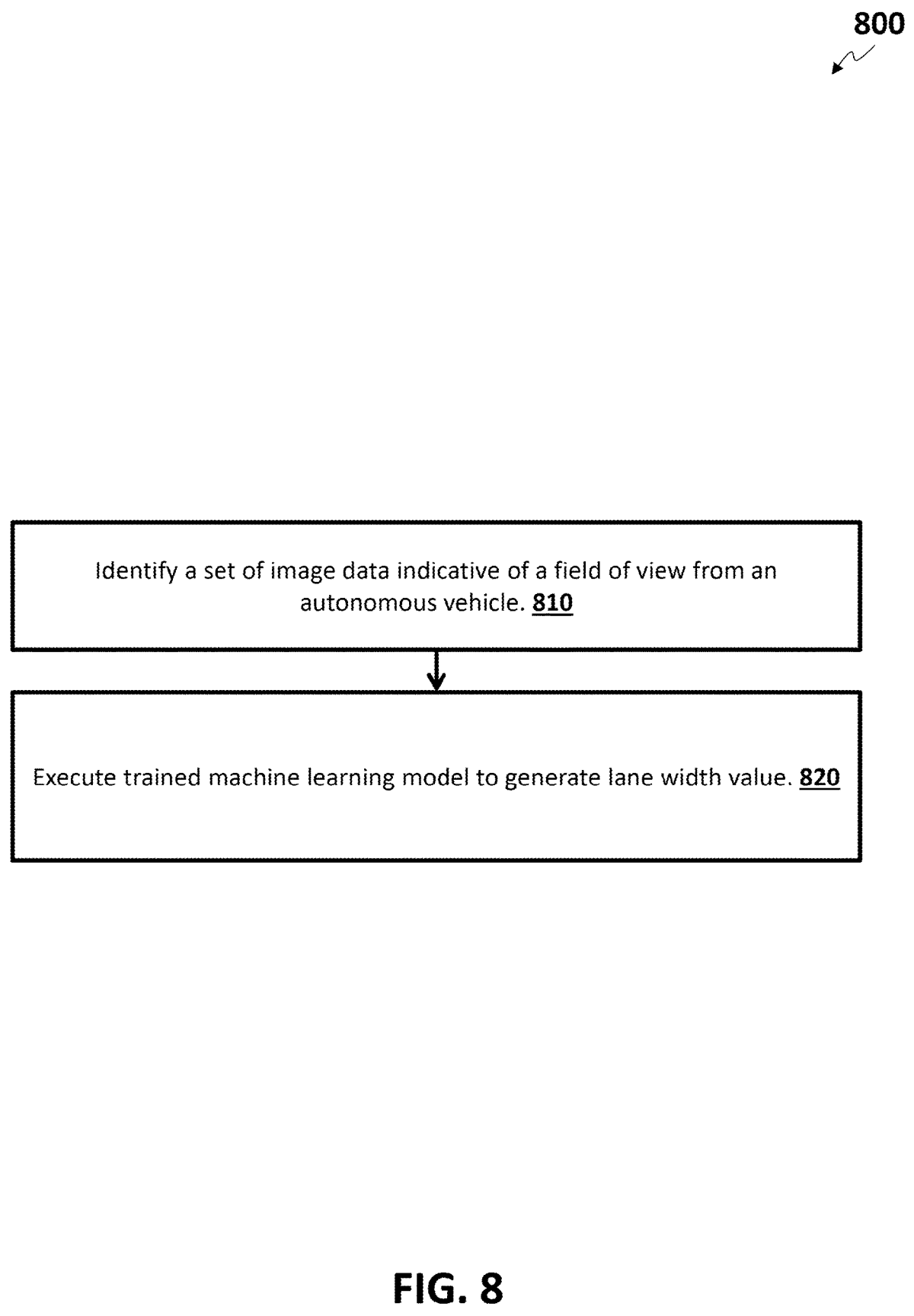

Identify a set of image data indicative of a field of view from an autonomous vehicle. 810

Execute trained machine learning model to generate lane width value. 820

FIG. 8

SYSTEMS AND METHODS FOR USING IMAGE DATA TO IDENTIFY LANE WIDTH

CROSS-REFERENCE TO RELATED APPLICATIONS

The present application is a continuation-in-part of U.S. application Ser. No. 18/303,460, filed Apr. 19, 2023, which claims priority to U.S. Provisional Application No. 63/447,766, filed Feb. 23, 2023, U.S. Provisional Application No. 63/434,843, filed Dec. 22, 2022, and U.S. Provisional Application No. 63/376,860, filed Sep. 23, 2022, each of which is incorporated herein by reference in its entirety for all purposes.

TECHNICAL FIELD

The present disclosure relates generally to using machine learning to analyze an image, and more particularly, to using machine learning to analyze an image to identify a lane width and to localize a vehicle.

BACKGROUND

In autonomous driving applications, the position of an autonomous vehicle is critical to monitor with sufficient accuracy. The position of the autonomous vehicle on a roadway is utilized to determine autonomous navigation and maneuvering. The existing solutions for localization rely on a combination of Global Navigation Satellite System (GNSS), an inertial measurement unit, and a digital map. However, such existing solutions can be either computationally expensive, unavailable (e.g., in a tunnel), or comprise significant errors in location (e.g., in an area with reduced signal reception) or location resolution.

SUMMARY

The systems and methods of the present disclosure may solve the problems set forth above and/or other problems in the art. The scope of the current disclosure, however, is defined by the attached claims, and not by the ability to solve any specific problem. Disclosed herein are techniques to improve lane attribute detection during autonomous vehicle operation through the use of machine learning models that generate lane indices, which correspond to the lane of a multi-lane roadway upon which the autonomous vehicle is operating. Rather than relying on potentially inaccurate sources of location data, such as GNSS, the systems and methods described herein provide techniques for training and executing machine learning models that generate lane information based on image data captured in real time or near real time by sensors of the autonomous vehicle.

Also disclosed herein are methods and systems to identify/predict a lane width. Moreover, the methods and systems discussed herein can be used to determine a total number of lanes associated with a road being driven by a vehicle.

In an embodiment, a method, comprises identifying, by one or more processors coupled to non-transitory memory, a set of image data captured by at least one autonomous vehicle when the at least one autonomous vehicle was positioned in a lane of a roadway, and respective ground truth localization data of the at least one autonomous vehicle; determining, by the one or more processors, a plurality of lane width values for the set of image data; labeling, by the one or more processors, the set of image data with the plurality of lane width values, the plurality of lane width values representing a width of a lane in which the at least one autonomous vehicle was positioned; and training, by the one or more processors, using the labeled set of image data, a machine learning model, such that the machine learning model is configured to predict a new lane width value for a new lane as output.

The plurality of lane width values may be determined based on the ground truth localization data.

The plurality of lane width values may be determined using an image recognition or image segmentation protocol.

The ground truth localization data may include data derived from a high-definition (HD) map.

A plurality of lane indications of the set of image data may be defined at least in part as a feature on a raster layer of the high-definition (HD) map.

The machine learning model may comprise a plurality of neural network layers.

The method may further comprise executing, by the one or more processors, the machine learning model for a second autonomous vehicle.

In another embodiment, a non-transitory machine-readable storage medium having computer-executable instructions stored thereon that, when executed by one or more processors, cause the one or more processors to perform operations comprises identify a set of image data captured by at least one autonomous vehicle when the at least one autonomous vehicle was positioned in a lane of a roadway, and respective ground truth localization data of the at least one autonomous vehicle; determine a plurality of lane width values for the set of image data; label the set of image data with the plurality of lane width values, the plurality of lane width values representing a width of a lane in which the at least one autonomous vehicle was positioned; and train using the labeled set of image data, a machine learning model, such that the machine learning model is configured to predict a new lane width value for a new lane as output.

The plurality of lane width values may be determined based on the ground truth localization data.

The plurality of lane width values may be determined using an image recognition or image segmentation protocol.

The ground truth localization data may include data derived from a high-definition (HD) map.

A plurality of lane indications of the set of image data may be defined at least in part as a feature on a raster layer of the high-definition (HD) map.

The machine learning model may comprise a plurality of neural network layers.

The instruction may further cause the one or more processors to executing, by the one or more processors, the machine learning model for a second autonomous vehicle.

In another embodiment, a system comprising a processor configured to identify a set of image data captured by at least one autonomous vehicle when the at least one autonomous vehicle was positioned in a lane of a roadway, and respective ground truth localization data of the at least one autonomous vehicle; determine a plurality of lane width values for the set of image data; label the set of image data with the plurality of lane width values, the plurality of lane width values representing a width of a lane in which the at least one autonomous vehicle was positioned; and train using the labeled set of image data, a machine learning model, such that the machine learning model is configured to predict a new lane width value for a new lane as output.

The plurality of lane width values is determined based on the ground truth localization data.

The plurality of lane width values may be determined using an image recognition or image segmentation protocol.

The ground truth localization data may include data derived from a high-definition (HD) map.

A plurality of lane indications of the set of image data are defined at least in part as a feature on a raster layer of the high-definition (HD) map.

The processor may be further configured to execute the machine learning model for a second autonomous vehicle.

In another embodiment, a method, comprises identifying, by one or more processors coupled to non-transitory memory, a set of image data captured by at least one autonomous vehicle when the at least one autonomous vehicle was positioned in a lane of a roadway, and respective ground truth localization data of the at least one autonomous vehicle; determining, by the one or more processors, a total number of lanes for the roadway; labeling, by the one or more processors, the set of image data with the total number of lanes for the roadway; and training, by the one or more processors, using the labeled set of image data, a machine learning model, such that the machine learning model is configured to predict a new total number of lanes for a new roadway as output.

The method may further comprise determining, by the one or more processors, a direction associated with at least one lane; and training, by the one or more processors, the machine learning model to predict a direction for at least one lane within the new roadway.

The method of claim 1, wherein the total number of lanes for the roadway is determined using an image recognition or image segmentation protocol.

The ground truth localization data may include data derived from a high-definition (HD) map.

A plurality of lane indications of the set of image data are defined at least in part as a feature on a raster layer of the high-definition (HD) map.

The machine learning model may comprise a plurality of neural network layers.

The method may further comprise executing, by the one or more processors, the machine learning model for a second autonomous vehicle.

In another embodiment, a non-transitory machine-readable storage medium having computer-executable instructions stored thereon that, when executed by one or more processors, cause the one or more processors to perform operations comprises identify a set of image data captured by at least one autonomous vehicle when the at least one autonomous vehicle was positioned in a lane of a roadway, and respective ground truth localization data of the at least one autonomous vehicle; determine a total number of lanes for the roadway; label the set of image data with the total number of lanes for the roadway; and train using the labeled set of image data, a machine learning model, such that the machine learning model is configured to predict a new total number of lanes for a new roadway as output.

The instructions may further cause the one or more processors to determine a direction associated with at least one lane; and train the machine learning model to predict a direction for at least one lane within the new roadway.

The total number of lanes for the roadway may be determined using an image recognition or image segmentation protocol.

The ground truth localization data may include data derived from a high-definition (HD) map.

The plurality of lane indications of the set of image data may be defined at least in part as a feature on a raster layer of the high-definition (HD) map.

The machine learning model may comprise a plurality of neural network layers.

The instructions may further cause the one or more processors to execute the machine learning model for a second autonomous vehicle.

In another embodiment, a system comprises a processor configured to identify a set of image data captured by at least one autonomous vehicle when the at least one autonomous vehicle was positioned in a lane of a roadway, and respective ground truth localization data of the at least one autonomous vehicle; determine a total number of lanes for the roadway; label the set of image data with the total number of lanes for the roadway; and train using the labeled set of image data, a machine learning model, such that the machine learning model is configured to predict a new total number of lanes for a new roadway as output.

The processor may be further configured to determine a direction associated with at least one lane; and train the machine learning model to predict a direction for at least one lane within the new roadway.

The total number of lanes for the roadway may be determined using an image recognition or image segmentation protocol.

The ground truth localization data may include data derived from a high-definition (HD) map.

A plurality of lane indications of the set of image data may be defined at least in part as a feature on a raster layer of the high-definition (HD) map.

The processor may be further configured to execute the machine learning model for a second autonomous vehicle.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 is a process for training a machine learning model to predict a lane width from real time image data, according to an embodiment.

FIG. 7 is a process for training a machine learning model to predict a total number of lanes from real time image data, according to an embodiment.

FIG. 8 is a process for training a machine learning model to predict a total number of lanes from real time image data, according to an embodiment.

DETAILED DESCRIPTION

Figure 1:
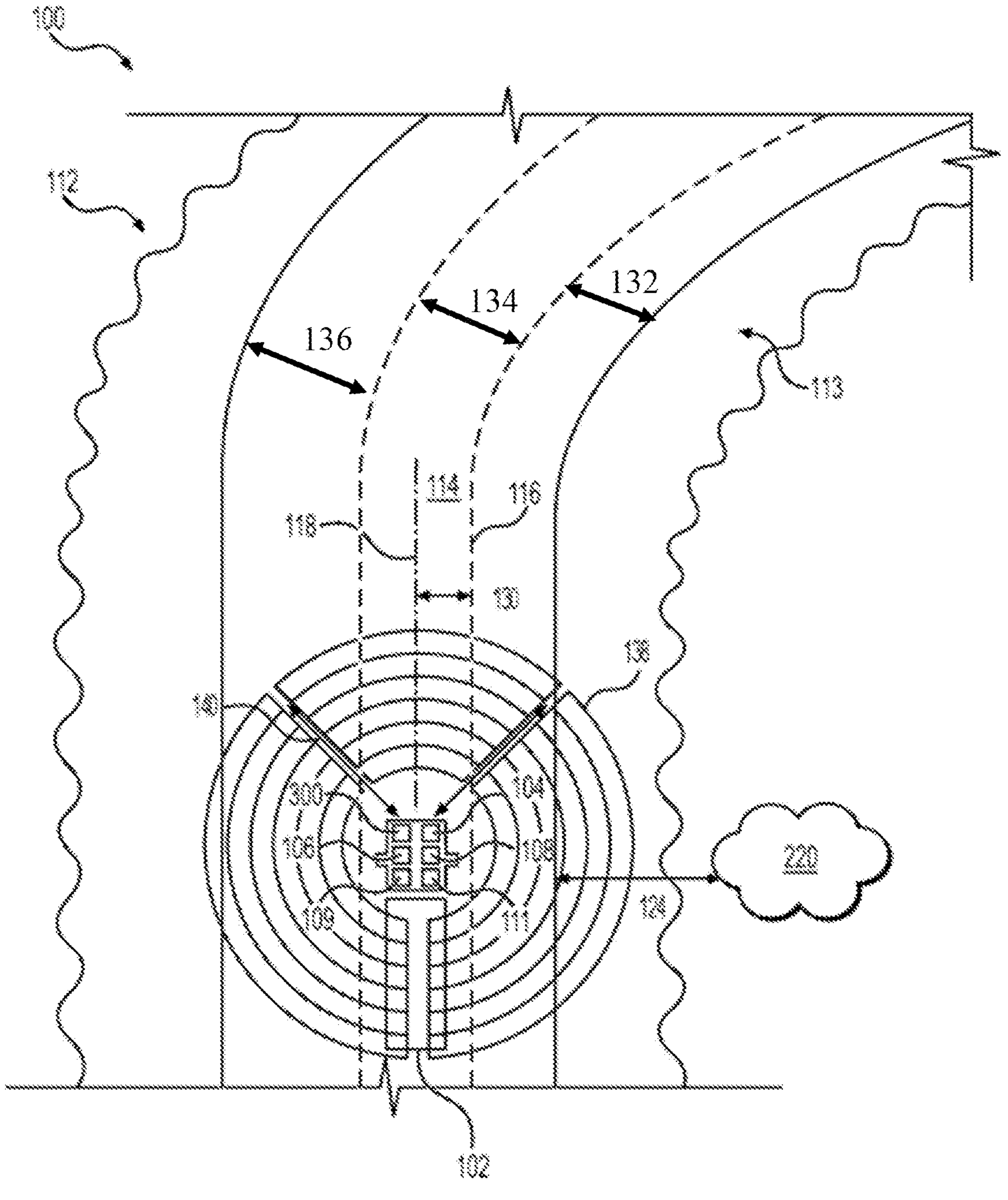
FIG. 1 is a schematic illustration including a bird's eye view of a vehicle traveling along a roadway using a lane attribute predictor, according to an embodiment.

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting, and it may be readily understood that certain aspects of the disclosed systems and methods can be variously arranged and combined, all of which arrangements and combinations are contemplated by this disclosure.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Autonomous vehicle virtual driver systems are structured on three pillars of technology: 1) perception, 2) maps/localization, and 3) behaviors planning and control. The mission of perception is to sense an environment surrounding an ego vehicle and interpret it. To interpret the surrounding environment, a perception engine may identify and classify objects or groups of objects in the environment. For example, an autonomous system may use a perception engine to identify one or more objects (e.g., pedestrians, vehicles, debris, etc.) in the road before a vehicle and classify the objects in the road as distinct from the road. The mission of maps/localization is to figure out where in the world, or where on a pre-built map, is the ego vehicle. One way to do this is to sense the environment surrounding the ego vehicle (e.g., perception systems) and to correlate features of the sensed environment with details (e.g., digital representations of the features of the sensed environment) on a digital map. Once the systems on the ego vehicle have determined its location with respect to the map features (e.g., intersections, road signs, etc.) the ego vehicle (or just "ego") can plan maneuvers and/or routes with respect to the features of the environment. The mission of behaviors, planning, and control is to make decisions about how the ego should move through the environment to get to its goal or destination. It consumes information from the perception engine and the maps/localization modules to know where it is relative to the surrounding environment and what other traffic actors are doing.

Localization, or the estimate of ego vehicle's position to varying degrees of accuracy, often with respect to one or more landmarks on a map, is critical information that may enable advanced driver-assistance systems or self-driving cars to execute autonomous driving maneuvers. Such maneuvers can often be mission or safety related. For example, localization may be a prerequisite for an ADAS or a self-driving car to provide intelligent and autonomous driving maneuvers to arrive at point C from points B and A. Currently existing solutions for localization may rely on a combination of Global Navigation Satellite System (GNSS), an inertial measurement unit (IMU), and a digital map (e.g., an HD map or other map file including one or more semantic layers).

Localizations can be expressed in various forms based on the medium in which they may be expressed. For example, a vehicle could be globally localized using a global positioning reference frame, such as latitude and longitude. The relative location of the ego vehicle with respect to one or more objects or features in the surrounding environment could then be determined with knowledge of ego vehicle's global location and the knowledge of the one or more objects' or feature's global location(s). Alternatively, an ego vehicle could be localized with respect to one or more features directly. To do so, the ego vehicle may identify and classify one or more objects or features in the environment and may do this using, for example, its own on board sensing systems (e.g., perception systems), such as LiDARs, cameras, radars, etc. and one or more on-board computers storing instructions for such identification and classification.

Environments intended for use by vehicles, whether such vehicles include autonomous features or not, tend to be pattern rich. That is, environments intended for use by automobiles are structured according to a pattern(s) that is recognizable by human drivers and increasingly by autonomous systems (e.g., all stop signs use same shape/color, all stop lights are green/yellow/red, etc.) The patterns enable and, indeed, may require predictable behavior by the operators of the vehicles in the environment, whether human or machine. One such pattern is used in lane indications, which may indicate lane boundaries intended to require particular behavior within the lane (e.g., maintaining a constant path with respect to the lane line, not crossing a solid lane line, etc.) Due to their consistency, predictability, and ubiquity, lane lines may serve as a good basis for a lateral component localization.

FIG. 1 illustrates a system 100 for localizing a vehicle 102. The vehicle 102 depicted in FIG. 1 is a truck (e.g., a tractor trailer), but it is to be understood that the vehicle 102 could be any type of vehicle including a car, a mobile machine, etc. The vehicle 102 includes a controller 300 that is communicatively coupled to a camera system 104, a LiDAR system 106, a GNSS 108, a transceiver 109, and an inertial measurement unit 111 (IMU). The vehicle 102 may operate autonomously or semi-autonomously in any environment. As depicted, the vehicle 102 operates along a roadway 112 that includes a left shoulder, a right shoulder, and multiple lanes including a center lane 114 that is bounded by a right center lane marker 116 (lane indicator or lane indication). The right center lane marker 116 is depicted as a dashed line in convention with the center lane markers in several-lane roadways or highways in the United States, however, the lane marker could take any form (e.g., solid line, etc.) In the particular scenario depicted in FIG. 1, the vehicle 102 is approaching a right turn 113 (or right hand bend in the roadway 112), but any type of roadway or situation is considered herein. For example, the vehicle 102 could be on a road that continues straight, turns left, includes an exit ramp, approaches a stop sign or other traffic signal, etc. Accordingly, the road being traveled by the vehicle 102 may include three lanes having widths 132 (for the right lane), 134 (for the middle lane), and 136 (for the left lane).

The vehicle 102 has various physical features and/or aspects including a longitudinal centerline 118. As depicted in FIG. 1, the vehicle 102 generally progresses down the roadway 112 in a direction parallel to its longitudinal centerline 118. As the vehicle 102 drives down the roadway 112, it may capture LiDAR point cloud data and visual camera data (when referred to collectively, "image data") using, for example, the LiDAR system 106 and the camera system 104, respectively. In some aspects, the vehicle 102 may also include other sensing systems (e.g., a radar system, etc.) While it travels, the vehicle 102 may constantly, periodically, or on-demand determine its position and/or orientation with the GNSS 108 and/or the IMU 111. The vehicle 102 may be communicatively coupled with a network 220 via a wireless connection 124 using, for example, the transceiver 109.

As the vehicle 102 travels, its systems and/or systems connected to the vehicle 102 may determine a lateral offset 130 from one or more features of the roadway 112. For example, in the particular embodiment depicted in FIG. 1, the vehicle 102 may calculate a lateral offset 130 from the right center lane marker 116. The lateral offset 130 may be, for example, a horizontal distance between the longitudinal centerline 118 of the vehicle 102 and the right center lane marker 116. However, these are merely two examples of features that could be used to calculate a vehicle offset. It is contemplated that any feature of the vehicle 102 (e.g., the right side, the left side, etc.) and any feature of the roadway 112 (e.g., the center lane left side marker, the right lane right side marker, the edge of the right shoulder, etc.) could be used to calculate a lateral offset. In some embodiments, the lateral offset 130 may be used to localize the vehicle 102 as described in greater detail herein.

Figure 3:
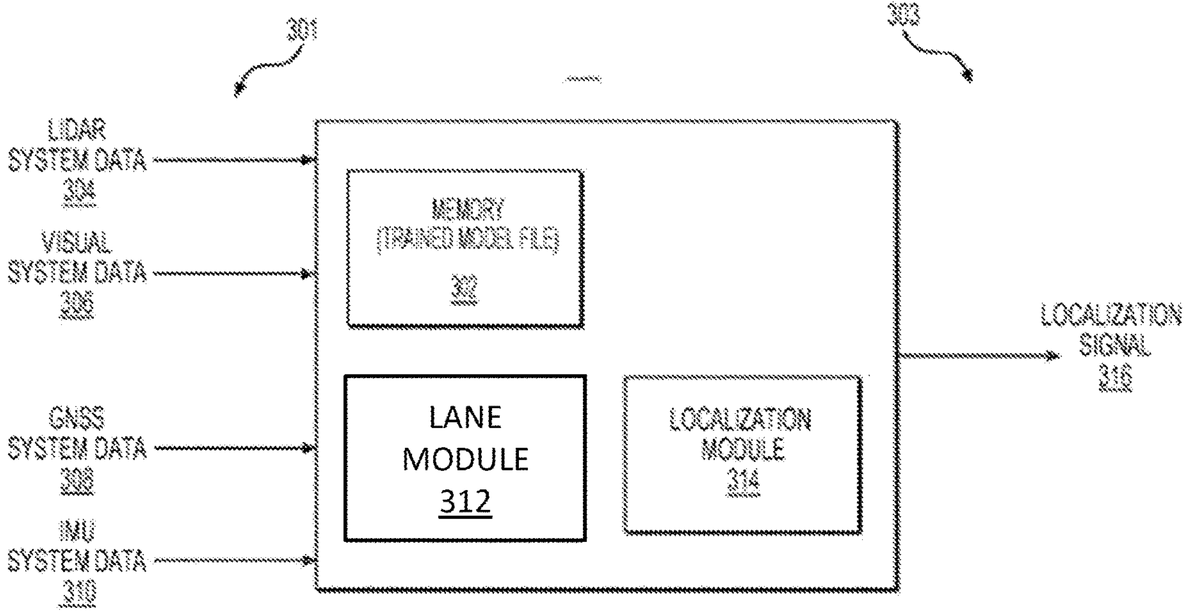
FIG. 3 is a controller for localizing a vehicle using real time data, such as in the scenario depicted in FIG. 1, according to an embodiment.

Still referring to FIG. 1, the controller 300, which is described in greater detail herein, especially with respect to FIG. 3, is configured to receive an input(s) and provide an output(s) to various other systems or components of the system 100. For example, the controller 300 may receive visual system data from the camera system 104, LiDAR system data from the LiDAR system 106, GNSS data from the GNSS 108, external system data from the transceiver 109, and IMU system data from the IMU 111.

The camera system 104 may be configured to capture images of the environment surrounding the vehicle 102 in a field of view (FOV) 138. Although depicted generally surrounding the vehicle 102, the FOV 138 can have any angle or aspect such that images of the areas ahead of, to the side, and behind the vehicle 102 may be captured. In some embodiments, the FOV 138 may surround 360 degrees of the vehicle 102. In some embodiments, the vehicle 102 includes multiple cameras and the images from each of the multiple cameras may be stitched to generate a visual representation of the FOV 138, which may be used to generate a birdseye view of the environment surrounding the vehicle 102, such as that depicted in FIG. 1. In some embodiments, the image file(s) generated by the camera system(s) 104 and sent to the controller 300 and other aspects of the system 100 may include the vehicle 102 or a generated representation of the vehicle 102. In some embodiments, the visual image generated from image data from the camera(s) 104 may appear generally as that depicted in FIG. 1 and show features depicted in FIG. 1 (e.g., lane markers, the roadway, etc.) distinguished from other objects as pixels in an image. In some embodiments, one or more systems or components of the system 100 may overlay labels to the features depicted in the image data, such as on a raster layer or other semantic layer of an HD map. The camera system 104 may include one or more cameras with fields of view horizontally from the vehicle 102 for specific view of the lane indications (including, for example, the right center lane marker 116).

The LiDAR system 106 can send and receive a LiDAR signal 140. Although depicted generally forward, left, and right of the vehicle 102, the LiDAR signal 140 can be emitted and received from any direction such that LiDAR point clouds (or "LiDAR images") of the areas ahead of, to the side, and behind the vehicle 102 can be captured. In some embodiments, the vehicle 102 includes multiple LiDAR sensors and the LiDAR point clouds from each of the multiple LiDAR sensors may be stitched to generate a LiDAR-based representation of the area covered by the LiDAR signal 140, which may be used to generate a birdseye view of the environment surrounding the vehicle 102. In some embodiments, the LiDAR point cloud(s) generated by the LiDAR sensors and sent to the controller 300 and other aspects of the system 100 may include the vehicle 102. In some embodiments, a LiDAR point cloud generated by the LiDAR system 106 may appear generally as that depicted in FIG. 1 and show features depicted in FIG. 1 (e.g., lane markers, the roadway, etc.) distinguished from other objects as pixels in a LiDAR point cloud. In some embodiments, the system inputs from the camera system 104 and the LiDAR system 106 may be fused.

The GNSS 108 may be positioned on the vehicle 102 and may be configured to determine a location of the vehicle 102, which it may embody as GNSS data, as described herein, especially with respect to FIG. 3. The GNSS 108 may be configured to receive one or more signals from a global navigation satellite system (GNSS) (e.g., GPS system) to localize the vehicle 102 via geolocation. In some embodiments, the GNSS 108 may provide an input to or be configured to interact with, update, or otherwise utilize one or more digital maps, such as an HD map (e.g., in a raster layer or other semantic map). In some embodiments, the GNSS 108 is configured to receive updates from the external network 220 (e.g., via a GNSS/GPS receiver (not depicted), the transceiver 109, etc.) The updates may include one or more of position data, speed/direction data, traffic data, weather data, or other types of data about the vehicle 102 and its environment.

The transceiver 109 may be configured to communicate with the external network 220 via the wireless connection 124. The wireless connection 124 may be a wireless communication signal (e.g., Wi-Fi, cellular, LTE, 5*g*, etc.). However, in some embodiments, the transceiver 109 may be configured to communicate with the external network 220 via a wired connection, such as, for example, during testing or initial installation of the system 100 to the vehicle 102. The wireless connection 124 may be used to download and install various lines of code in the form of digital files (e.g., HD maps), executable programs (e.g., navigation programs), and other computer-readable code that may be used by the system 100 to navigate the vehicle 102 or otherwise operate the vehicle 102, either autonomously or semi-autonomously. The digital files, executable programs, and other computer readable code may be stored locally or remotely and may be routinely updated (e.g., automatically or manually) via the transceiver 109 or updated on demand. In some embodiments, the vehicle 102 may deploy with all of the data it needs to complete a mission (e.g., perception, localization, and mission planning) and may not utilize the wireless connection 124 while it is underway.

The IMU 111 may be an electronic device that measures and reports one or more features regarding the motion of the vehicle 102. For example, the IMU 111 may measure a velocity, acceleration, angular rate, and or an orientation of the vehicle 102 or one or more of its individual components using a combination of accelerometers, gyroscopes, and/or magnetometers. The IMU 111 may detect linear acceleration using one or more accelerometers and rotational rate using one or more gyroscopes. In some embodiments, the IMU 111 may be communicatively coupled to the GNSS 108 and may provide an input to and receive an output from the GNSS 108, which may allow the GNSS 108 to continue to predict a location of the vehicle 102 even when the GNSS cannot receive satellite signals.

Figure 2:
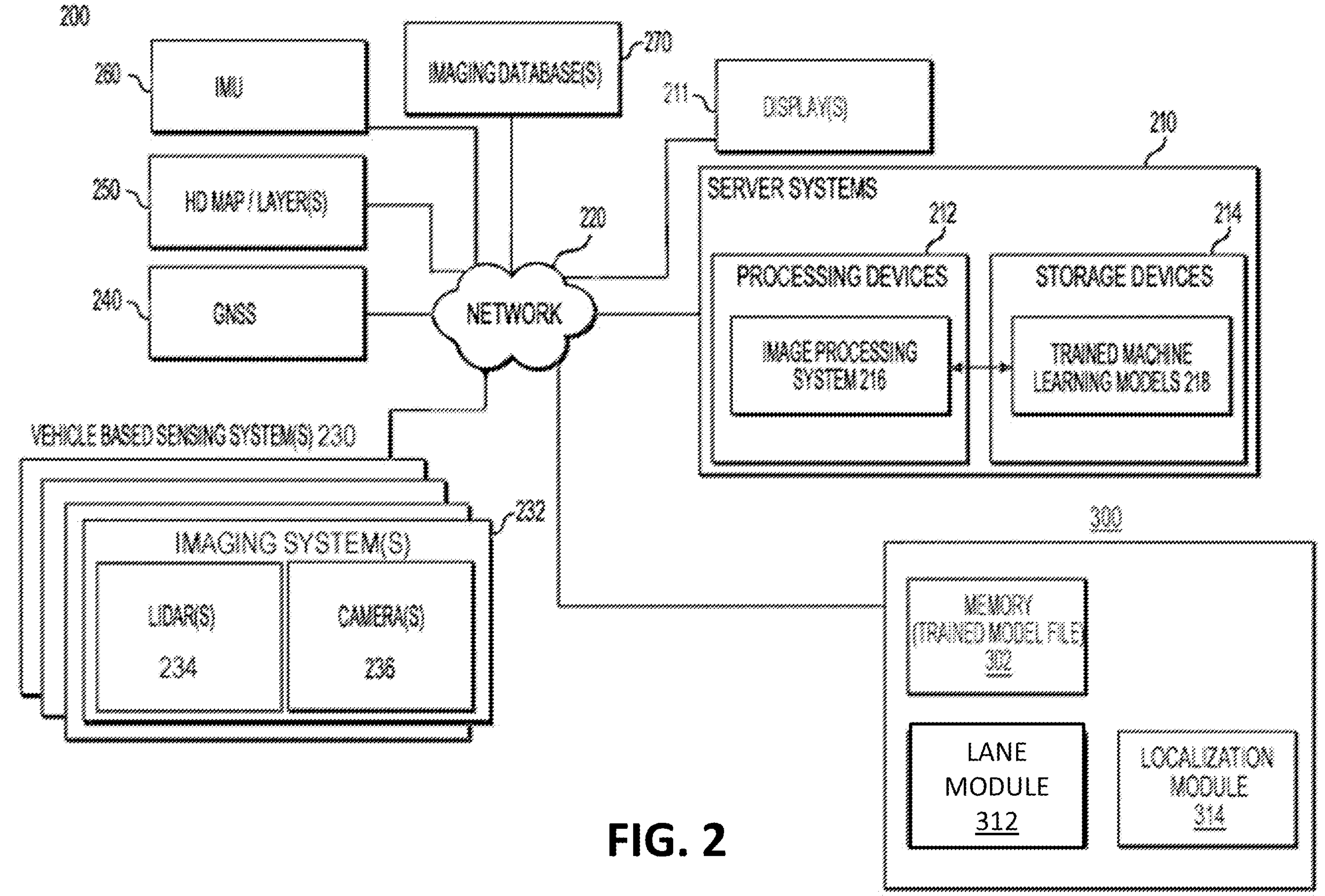
FIG. 2 is an exemplary environment for creating one or more trained machine learning algorithms for predicting a lane attribute, such as the lane attribute of FIG. 1, according to an embodiment.

Referring now to FIG. 2, an exemplary environment 200 for generating and training machine learning models to predict a lane attribute according to an exemplary process of the present disclosure is shown. FIG. 2 includes the environment 200 which may include the network 220 that communicatively couples one or more server systems 210, one or more vehicle based sensing systems 230 which may include one or more imaging systems 232 (e.g., LiDAR systems and/or camera systems), one or more GNSS systems 240, one or more HD map systems 250, one or more IMU systems 260, and one or more imaging databases 270. Additionally, the controller 300 of FIGS. 1 and 3 may be communicatively coupled to the network 220 and may upload and download data from one or more of the other systems connected to the network 220 as described herein. In some embodiments, the exemplary environment may include one or more displays, such as the display 211, for displaying information.

The server systems 210 may include one or more processing devices 212 and one or more storage devices 214. The processing devices 212 may be configured to implement an image processing system 216. The image processing system 216 may apply AI, machine learning, and/or image processing techniques to image data received, e.g., from vehicle based sensing systems 230, which may include LiDAR(s) 234, camera(s) 236. Other vehicle based sensing systems are contemplated such as, for example, radar, ultrasonic sensing, etc. The vehicle based sensing systems 230 may be deployed on, for example, a fleet of vehicles such as the vehicle 102 of FIG. 1.

Still referring to FIG. 2, the image processing system 216 may include a training image platform configured to generate and train a plurality of trained machine learning models 218 based on datasets of training images received, e.g., from one or more imaging databases 270 over the network 120 and/or from the vehicle based sensing systems 230 on the fleet of vehicles. In some embodiments, data generated using the vehicle based sensing systems 230 may be used to populate the imaging databases 270. The training images may be, for example, images of vehicles operating on a roadway including one or more lane boundaries or lane features (e.g., a lane boundary line, a right roadway shoulder edge, etc.) The training images may be real images or synthetically generated images (e.g., to compensate for data sparsity, if needed). The training images received may be annotated e.g., using one or more of the known or future data annotation techniques, such as polygons, brushes/erasers, bounding boxes, keypoints, keypoint skeletons, lines, ellipses, cuboids, classification tags, attributes, instance/object tracking identifiers, free text, and/or directional vectors, in order to train any one or more of the known or future model types, such as image classifiers, video classifiers, image segmentation, object detection, object direction, instance segmentation, semantic segmentation, volumetric segmentation, composite objects, keypoint detection, keypoint mapping, 2-Dimension/3-Dimension and 6 degrees-of-freedom object poses, pose estimation, regressor networks, ellipsoid regression, 3D cuboid estimation, optical character recognition, text detection, and/or artifact detection.

The trained machine learning models 218 may include convolutional neural networks (CNNs), support vector machines (SVMs), generative adversarial networks (GANs), and/or other similar types of models that are trained using supervised, unsupervised, and/or reinforcement learning techniques. For example, as used herein, a "machine learning model" generally encompasses instructions, data, and/or a model configured to receive input, and apply one or more of a weight, bias, classification, or analysis on the input to generate an output. The output may include, e.g., a classification of the input, an analysis based on the input, a design, process, prediction, or recommendation associated with the input, or any other suitable type of output. A machine learning system or model may be trained using training data, e.g., experiential data and/or samples of input data, which are fed into the system in order to establish, tune, or modify one or more aspects of the system, e.g., the weights, biases, criteria for forming classifications or clusters, or the like. The training data may be generated, received, and/or otherwise obtained from internal or external resources. Aspects of a machine learning system may operate on an input linearly, in parallel, via a network (e.g., a neural network), or via any suitable configuration.

The execution of the machine learning system may include deployment of one or more machine learning techniques, such as linear regression, logistical regression, random forest, gradient boosted machine (GBM), deep learning, and/or a deep neural network (e.g., multi-layer perceptron (MLP), CNN, recurrent neural network). Supervised and/or unsupervised training may be employed. For example, supervised learning may include providing training data and labels corresponding to the training data, e.g., as ground truth. Training data may comprise images annotated by human technicians (e.g., engineers, drivers, etc.) and/or other autonomous vehicle professionals. Unsupervised approaches may include clustering, classification, or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc. Alternatively, reinforcement learning may be employed for training. For example, reinforcement learning may include training an agent interacting with an environment to make a decision based on the current state of the environment, receive feedback (e.g., a positive or negative reward based on accuracy of decision), adjusts its decision to maximize the reward, and repeat again until a loss function is optimized.

The trained machine learning models 218 may be stored by the storage device 214 to allow subsequent retrieval and use by the system 210, e.g., when an image is received for processing by the vehicle 102 of FIG. 1. In other techniques, a third party system may generate and train the plurality of trained machine learning models 218. The server systems 210 may send and/or receive trained machine learning models 218 from the third party system and store within the storage devices 214. In some examples, the images generated by the imaging systems 232 may be transmitted over the network 220 to the imaging databases 270 or to the server systems 210 for use as training image data. In some embodiments, the trained machine learning models 218 may be trained to generate a trained model file which may be sent, for example, to a memory 302 of the controller 300 and used by the vehicle 102 to localize the vehicle 102 as described in greater detail herein.

The network 220 over which the one or more components of the environment 200 communicate may be a remote electronic network and may include one or more wired and/or wireless networks, such as a wide area network ("WAN"), a local area network ("LAN"), personal area network ("PAN"), a cellular network (e.g., a 3G network, a 4G network, a 5G network, etc.) or the like. In one technique, the network 120 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The server systems 210, imaging systems 230, GNSS 240, HD Map 250, and IMU 260, and/or imaging databases 270 may be connected via the network 120, using one or more standard communication protocols. In some embodiments, the vehicle 102 (FIG. 1) may be communicatively coupled (e.g., via the controller 300) with the network 220.

The GNSS 240 may be communicatively coupled to the network 220 and may provide highly accurate location data to the server systems 210 for one or more of the vehicles in a fleet of vehicles. The GNSS signal received from the GNSS 240 of each of the vehicles may be used to localize the individual vehicle on which the GNSS receiver is positioned. The GNSS 240 may generate location data which may be associated with a positon from which particular image data is captured (e.g., a location at which an image is captured) and, in some embodiments, may be considered a ground truth position for the image data. In some embodiments, image data captured by the one or more vehicles in the fleet of vehicles may be associated with (e.g., stamped) with data from the GNSS 240 which may relate the image data to an orientation, a velocity, a position, or other aspect of the vehicle capturing the image data. In some embodiments, the GNSS 240 may be used to associate location data with image data such that a subset of the trained model file can be generated based on the capture location of a particular set of image data to generate a location-specific trained model file.

In some embodiments, the HD map 250, including one or more layers, may provide an input to or receive an input from one or more of the systems or components connected to the network 220. For example, the HD map 250 may provide raster map data as an input to the server systems 210 which may include data categorizing or otherwise identifying portions, features, or aspects of a vehicle lane (e.g., the lane markings of FIG. 1) or other features of the environment surrounding a vehicle (e.g., stop signs, intersections, street names, etc.)

The IMU 260 may be an electronic device that measures and reports one or more of a specific force, angular rate, and/or the orientation of a vehicle (e.g., the vehicle 102 of FIG. 1) using a combination of accelerometers, gyroscopes, and/or magnetometers. The IMU 260 may be communicatively coupled to the network 220 and may provide dead reckoning position data or other position, orientation, or movement data associated with one or more vehicles in the fleet of vehicles. In some embodiments, image data captured by the one or more vehicles in the fleet of vehicles may be associated with (e.g., stamped) with data from the IMU 260 which may relate the image data to a position, orientation, or velocity of the vehicle capturing the data. In some embodiments, data from the IMU 260 may be used in parallel with or in place of GNSS data from the GNSS 240 (e.g., when a vehicle captures image data from inside a tunnel where no GNSS signal is capable).

Referring now to FIG. 3, the controller 300 is depicted in greater detail. The controller 300 may receive inputs 301 and generate outputs 303. The controller 300 may include a memory 302, a lane module 312, and a localization module 314. The inputs 301 may include LiDAR system data 304, visual system data 306, GNSS system data 308, and IMU system data 310. The outputs 303 may include a localization signal 316. The memory 302 may include a trained model file, which may have been trained, for example, by the machine learning models 218 of FIG. 2.

The controller 300 may comprise a data processor, a microcontroller, a microprocessor, a digital signal processor, a logic circuit, a programmable logic array, or one or more other devices for controlling the system 100 in response to one or more of the inputs 301. Controller 300 may embody a single microprocessor or multiple microprocessors that may include means for automatically generating a localization of the vehicle 102. For example, the controller 300 may include a memory, a secondary storage device, and a processor, such as a central processing unit or any other means for accomplishing a task consistent with the present disclosure. The memory or secondary storage device associated with controller 300 may store data and/or software routines that may assist the controller 300 in performing its functions.

Further, the memory or secondary storage device associated with the controller 300 may also store data received from various inputs associated with the system 100. Numerous commercially available microprocessors can be configured to perform the functions of the controller 300. It should be appreciated that controller 300 could readily embody a general machine controller capable of controlling numerous other machine functions. Alternatively, a special-purpose machine controller could be provided. Further, the controller 300, or portions thereof, may be located remote from the system 100. Various other known circuits may be associated with the controller 300, including signal-conditioning circuitry, communication circuitry, hydraulic or other actuation circuitry, and other appropriate circuitry.

The memory 302 may store software-based components to perform various processes and techniques described herein of the controller 300, including the lane module 312, and the localization module 314. The memory 302 may store one or more machine readable and executable software instructions, software code, or executable computer programs, which may be executed by a processor of the controller 300. The software instructions may be further embodied in one or more routines, subroutines, or modules and may utilize various auxiliary libraries and input/output functions to communicate with other equipment, modules, or aspects of the system 100.

As mentioned above, the memory 302 may store a trained model file(s) which may serve as an input to one or more of the lane module 312 and/or the localization module 314. The trained model file(s) may be stored locally on the vehicle such that the vehicle need not receive updates when on a mission. The trained model files may be machine-trained files that include associations between historical image data and historical lane attribute data associated with the historical image data. The trained model file may contain trained lane attribute data that may have been trained by one or more machine-learning models having been configured to learn associations between the historical image data and the historical lane attribute data as will be described in greater detail herein. In some embodiments, the trained model file may be specific to a particular region or jurisdiction and may be trained specifically on that region or jurisdiction. For example, in jurisdictions in which a lane indication has particular features (e.g., a given length, width, color, etc.) the trained model file may be trained on training data including only those features. The features and aspects used to determine which training images to train a model file may be based on, for example, location data as determined by the GNSS system 108, for example.

The lane module 312 may predict a lane attribute in association with the vehicle 102. As used herein, an attribute of the lane may include any data, such as a width of the lane (e.g., the lane being driven by the vehicle 102) and a total number of lanes.

In an embodiment, the lane module 312 or the controller 300 may execute a lane analysis module to generate one or more lane indices based on data captured during operation of the autonomous vehicle. The lane module 312 may be configured to generate and/or receive, for example, one or more trained model files in order to that may then be used, along with other data (e.g., LiDAR system data 304, visual system data 306, GNSS system data 308, IMU system data 310, and/or the trained model file) by the localization module 314 to localize the vehicle 102.

FIG. 4 is a flowchart diagram of an example method of training machine learning models to generate lane width based on image data, according to an embodiment. The steps of the method 400 of FIG. 4 may be executed, for example, by any of the processors, servers, or autonomous vehicles described in connection with the system 100, 200, the controller 300, or any other processor or module discussed herein, according to some embodiments. The method 400 shown in FIG. 4 comprises execution steps 410-440. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously with one another.

The method 400 of FIG. 4 is described as being performed by a server, which may include the server systems 210 depicted in FIG. 2. However, it should be understood that any device or system with one or more processors, may perform the steps of the method 400, including the controller 300 depicted in FIG. 3 or any other processor discussed herein.

In some embodiments, one or more of the steps may be performed by a different processor, server, or any other computing device. For instance, one or more of the steps may be performed via a cloud-based service including any number of servers, which may be in communication with the processor of the autonomous vehicle and/or its autonomy system. In a non-limiting example, a first processor may train the machine learning model discussed herein, and a local processor (e.g., a processor of a vehicle) may transmit the images captured by the vehicle to the trained model and execute the model itself.

Although the steps shown in FIG. 4 have a particular order, it is intended that the steps may be performed in any order. It is also intended that some of these steps may be optional.

At step 410, a server (e.g., the server system 210) may identify a set of image data captured by at least one autonomous vehicle when the at least one autonomous vehicle was positioned in a lane of a roadway, and respective ground truth localization data of the at least one autonomous vehicle. The server may identify a set of image data captured by one or more autonomous vehicles (e.g., the vehicle 102) when the one or more autonomous vehicles were positioned in respective lanes of one or more roadways. The server can further identify respective ground truth localization data of the at least one autonomous vehicle representing the position of the autonomous vehicle on the roadway when the set of image data was captured. In an embodiment, the ground truth localization data can include multiple locations of the autonomous vehicle, with each or position within the roadway corresponding to a respective image in the set of image data. The image data may include LiDAR images (e.g., collections of LiDAR points, a point cloud, etc.) captured by LiDAR sensors of the autonomous vehicle or visual images (e.g., images, video frames) captured by cameras of the autonomous vehicle. To obtain the image data, steps similar to those described in connection with step 402 of FIG. 4 may be performed.

The ground truth localization data may be identified as stored in association with the set of image data received from one or more autonomous vehicles. The ground truth localization may include a relative and/or absolute position (e.g., GPS coordinates, latitude/longitude coordinates, etc.) and may be obtained separately or contemporaneously with the image data. In some embodiments, portions of the ground truth localization data may represent the ground truth location of the vehicle capturing the image data at the time the image was captured. For example, while capturing LiDAR or camera images or video frames, the autonomous vehicle may capture highly accurate GNSS data (e.g., using the GNSS 108). In some embodiments, the server can generate a confidence value for one or more of the ground truth information sources, and the ground truth information sources may be selected based on the confidence values. Identifying the ground truth localization data may include retrieving the ground truth localization data from a memory or database, or receiving the ground truth localization data from one or more autonomous vehicles that captured the set of image data. In an embodiment, at least a portion of the ground truth localization data may include data derived from an HD map. For example, localization of the autonomous vehicle may be determined based on one or more lane indications in the set of image data that are defined at least in part as a feature on a raster layer of the HD map, as described herein. Identifying the ground truth localization data can include any of the operations described herein.

At step 420, the server may determine a plurality of lane width values for the set of image data. The server may determine lane width values for the set of image data based on the ground truth localization data. The lane width values can identify a width of one or more lanes of a road (e.g., multiway roadway) in which the autonomous vehicle was traveling when the autonomous vehicle captured an image of the image data. The lane with values can be an integer that indicates the width of a lane being traveled and/or other lanes within the road.

The lane width values may be determined, at least in part, based on a localization process. For example, the server can utilize the ground truth localization data to identify a location of the autonomous vehicle in the roadway, as described herein. Using that localization data, and data from, for example, HD maps or other data sources that include information relating to the roadway upon which the autonomous vehicle was traveling, the server can determine a distance between the autonomous vehicle and the lane lines. Knowing the width of the autonomous vehicle itself, the server may calculate a width for the lane as well.

For the lanes not being traveled by the autonomous vehicle, the server may use an image recognition protocol and/or image segmentation protocols to identify lane width values. For instance, the server may determine a location of the lane lines and compare the distance between the lane lines to a known object within the image, such as the autonomous vehicle itself, known landmarks, other vehicles, and the like. In some embodiments, the server may determine the lane width using various extrinsic sources, such as retrieving data from an HD map to augment its calculation of the lane width.

Figure 5:
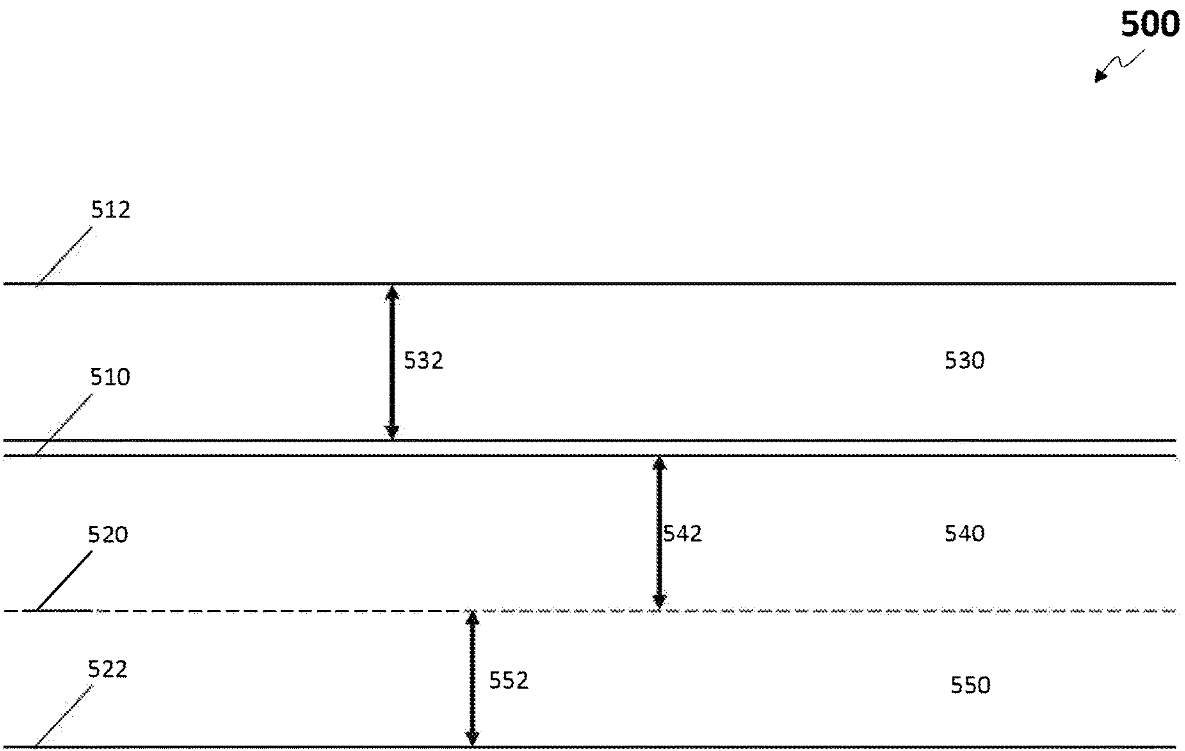
FIG. 5 illustrates a roadway, according to an embodiment.

Referring to FIG. 5, a non-limiting example of images received from one or more autonomous vehicles is depicted, in accordance with an embodiment. FIG. 5 illustrates Lidar data received from an autonomous vehicle traveling the roadway 500. The roadway 500 may include three lanes 530, 540, and 550) where each lane is separated by lane lines, such as lane lines 510 and 520. Additionally, lanes 530 and 550 may also have side lane lines 512 and 522 accordingly. When the server receives the image depicted in FIG. 5 from a LiDAR sensor of the autonomous vehicle, the server may perform various analytical protocols discussed herein to identify each lane's width, as depicted in lane width values 532, 542, and 552.

Referring back to FIG. 4, at step 430, the server may label the set of image data with the plurality of lane width values, the plurality of lane width values representing a width of a lane in which the at least one autonomous vehicle was positioned. The server may label the set of image data with the plurality of lane width values to generate a set of training data for one or more machine learning models, as described herein. Labeling the data can include associating each image with the respective lane index values determined for the image in step 420. Each respective lane width value can be utilized as a ground truth value for training a respective machine learning model, as described herein. Labeling can include performing steps similar to those described in connection with step 408 of FIG. 4. In an embodiment, the server can allocate a portion of the training data as an evaluation set, which may not be utilized for training but may be utilized to evaluate the performance of machine learning models trained using the training data described herein.

In some embodiments, the position of various features in the environment surrounding the vehicle may be known based on input from, for example, a digital map (e.g., an HD map). For example, a ground truth location of one or more lane indications or other features of the environment may be included as data in a map file (e.g., in one or more raster layers of an HD map file or other semantic map files) as feature ground truth location data (e.g., lane indicator ground truth location data). In such embodiments, the ground truth location of the particular features (as determined from the digital map) and may be compared to a ground truth location of an autonomous vehicle (as determined, for example, based on a GNSS signal or IMU signal) and a lane offset, lane width, total number of lanes could be generated based on this difference between the ground truth location of the feature (e.g., the lane indication) and the vehicle feature (e.g., the centerline).

It should also be understood that image data (e.g., camera data and/or LiDAR data) obtained by one or more ego vehicles in a fleet of vehicles can be captured, recorded, stored, and labeled with ground truth location data for use to train a machine learning model(s) to predict a lane offset using only real-time image data captured by an ego vehicle using a camera or LiDAR system and presenting the captured real-time image data to the machine learning model(s). The use of such models may significantly reduce computational requirements aboard a fleet of vehicles utilizing the method(s) and may make the vehicles more robust to meeting location-based requirements, such as localization and behavior planning, and mission control.

At step 440, the server may train, using the labeled set of image data, machine learning models that generate a lane width value as output. The machine learning models may be similar to the machine learning models 218 described herein and may include one or more neural network layers (e.g., convolutional layers, fully connected layers, pooling layers, activation layers, and/or normalization layers). Training the machine learning models can include performing operations similar to those described herein. In some embodiments, to train the machine learning model, the predicted lane width output by the machine learning model for given image data may be compared to the label corresponding to the ground truth location to determine a loss or error. For example, a predicted lane width value for a first training image may be compared to a known lane width (ground truth) identified by the corresponding label. The machine learning model may be modified or altered (e.g., weights and/or bias may be adjusted) based on the error to improve the accuracy of the machine learning model. This process may be repeated for each training image or at least until a determined loss or error is below a predefined threshold. In some examples, at least a portion of the training images and corresponding labels (e.g., ground truth location) may be withheld and used to further validate or test the trained machine learning model.

The machine learning models can be trained using supervised and/or unsupervised training techniques. For example, using a supervised learning approach, the machine learning models may be trained using providing training data and labels corresponding to the training data (e.g., as ground truth). The training data may include a respective label for each of the machine-learning models for a given input image. During training, the machine learning models may be provided with the same input data but may be trained using different and respective labels.

In an embodiment, the server can evaluate the machine learning models based on the set of training data allocated as an evaluation set. Evaluating the machine learning models can include determining accuracy, precision and recall, and F1 score, among others. The machine learning models can be iteratively trained until a training termination condition (e.g., a maximum number of iterations, a performance threshold determined using the evaluation dataset, a rate of change in model parameters falling below a threshold, etc.) has been reached. Once trained, the machine learning models can be provided to one or more autonomous vehicles for execution during the operation of the autonomous vehicle. The machine learning models can be executed by autonomous vehicles to efficiently generate predictions of lane widths, which may be utilized by the autonomous vehicle to perform localization in real-time or near real-time and/or make a decision regarding autonomous driving.

In an embodiment, the method 400 of FIG. 4 may be executed to train one or more additional machine learning models using additional ground truth data and/or input data (e.g., any of the LiDAR system data, the visual system data, the GNSS system data, and/or the IMU system data). The additional machine learning models may have any suitable architecture (e.g., a neural network, a CNN, a regression model, etc.), and may be trained according to the supervised or unsupervised learning techniques described herein to output various characteristics of the roadway using at least image data described herein as input. For example, the additional machine learning models may be trained to output one or more of respective distances from respective shoulders, lane width of one or more lanes of the roadway, shoulder width of the roadway, a classification of the type of road, a classification of whether there is an intersection in the roadway, and classifications of lane line types around the autonomous vehicle on the roadway (e.g., solid lane lines, dashed lane lines, etc.).

Figure 6:
FIG. 6 is a process for executing a machine learning model to predict a lane width from real time image data, according to an embodiment.

FIG. 6 is a flowchart diagram of an example method of using machine learning models to predict a lane width value using real-time image data, according to an embodiment. The steps of the method 600 of FIG. 6 may be executed, for example, by an autonomous vehicle system, including vehicle 102, the controller 300, or any other processor discussed herein, according to some embodiments. The method 600 shown in FIG. 6 comprises execution steps 610-620. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously with one another.

The method 600 of FIG. 6 is described as being performed by an autonomous vehicle system (e.g., the vehicle 102 and/or the controller 300). However, in some embodiments, one or more of the steps may be performed by a different processor(s) or any other computing device. For instance, one or more of the steps may be performed via a cloud-based service or another processor in communication with the processor of the autonomous vehicle and/or its autonomy system. Although the steps are shown in FIG. 6 as having a particular order, it is intended that the steps may be performed in any order. It is also intended that some of these steps may be optional.

At step 610, the autonomous vehicle system of an autonomous vehicle can identify image data indicative of a field of view from the autonomous vehicle when the autonomous vehicle is positioned in a lane of a multi-lane roadway. The image data may include LiDAR images (e.g., collections of LiDAR points, a point cloud, etc.) captured by LiDAR sensors of the autonomous vehicle or visual images (e.g., images, video frames) captured by cameras of the autonomous vehicle. The server may use various protocols discussed herein to identify and/or pre-process the image data. The image data may be captured by one or more cameras or sensors of the autonomous vehicle, and stored in the memory of the autonomous vehicle system for processing, in a non-limiting example. In an embodiment, the steps of the method 600 may be performed upon capturing additional image data during the operation of the autonomous vehicle on the multi-lane roadway.

At step 620, the autonomous vehicle system may execute machine learning models using the image data as input to generate/predict a lane width value. To execute the machine learning models, the autonomous vehicle system can propagate the image data identified in step 610 through each layer of each of the machine learning models, performing the mathematical calculations of each successive layer based at least on the output of each previous layer or the input data. Each of the machine learning models may respectively output one or more of a lane width value. In an embodiment, the autonomous vehicle system can execute additional machine learning models using input data to generate various predictions of road characteristics, as described herein.

In some embodiments, the autonomous vehicle system can localize the autonomous vehicle based on the predictions generated in step 620. For example, the autonomous vehicle system may localize the autonomous vehicle by correlating the lane index values and/or lane width values with other data (e.g., longitudinal position data, which may be generated based on one or more of, for example, a GNSS system of the autonomous vehicle or an IMU system of the autonomous vehicle) to localize the autonomous vehicle. Localizing the autonomous vehicle can include generating an accurate lateral position based on the lane index values and an accurate, longitudinal position based on the GNSS and the IMU.

Using the methods 400 and 600, the server can collect and analyze image data received from a plurality of vehicles. Using the analyzed set of images, the server may train a machine learning model to ingest a new set of images (e.g., video feed or LiDAR sensor) from a new vehicle and predict a lane width for the roadway in which the new vehicle is located.

FIG. 7 is a flowchart diagram of an example method of training machine learning models to predict a total number of lanes based on image data, according to an embodiment. The steps of the method 700 of FIG. 7 may be executed, for example, by any of the processors, servers, or autonomous vehicles described in connection with the system 100, 200, the controller 300, or any other processor or module discussed herein, according to some embodiments. The method 700 shown in FIG. 7 comprises execution steps 710-740. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously with one another.

The method 700 of FIG. 7 is described as being performed by a server, which may include the server systems 210 depicted in FIG. 2. However, it should be understood that any device or system with one or more processors, may perform the steps of the method 700, including the controller 300 depicted in FIG. 3 or any other processor discussed herein.

In some embodiments, one or more of the steps may be performed by a different processor, server, or any other computing device. For instance, one or more of the steps may be performed via a cloud-based service including any number of servers, which may be in communication with the processor of the autonomous vehicle and/or its autonomy system. In a non-limiting example, a first processor may train the machine learning model discussed herein, and a local processor (e.g., a processor of a vehicle) may transmit the images captured by the vehicle to the trained model and execute the model itself.

Although the steps are shown in FIG. 7 has a particular order, it is intended that the steps may be performed in any order. It is also intended that some of these steps may be optional.

At step 710, the server may identify a set of image data captured by at least one autonomous vehicle when the at least one autonomous vehicle was positioned in a lane of a roadway and the respective ground truth localization data of at least one autonomous vehicle. Similar to the step 410 (FIG. 4), the server may collect image data. As discussed herein, image data may include any data, collected from one or more sensors of the autonomous vehicle, that correspond to the vehicle's surroundings. For instance, the methods and systems discussed herein may use LiDAR data and/or data received from a camera.

At step 720, the server may determine the total number of lanes. Using the methods and systems discussed herein, the server may determine the number of each lane in accordance with their corresponding lane lines. For instance, the server may analyze the images received (using image recognition or segmentation protocols) to determine the position (or number of lane lines). Using the identified lane lines, the server may determine the total number of lanes for the roadway. For instance, and referring back to FIG. 5, the server may identify the lanes 530, 540, and 550 in accordance with the lane lines 510, 512, 520, and 522 respectively.

In some embodiments, extrinsic data, such as manual human reviewers, HD maps, and other data indicating the number of lanes may be used to identify and/or confirm the number of lanes.

In some embodiments, the server may also determine (using image recognition, extrinsic data, human reviewers, and the like) a direction associated with each lane. For instance, using a location-tracking sensor of the vehicle associated with each set of images, the server may determine a direction of travel associated with the set of images. In a non-limiting example, the server may determine that the vehicle associated with the set of images being analyzed is traveling westbound. As a result, the server may assume that the lane (in which the vehicle is located) is westbound. In some embodiments, the lane line type may also be used to determine directionality. For instance, referring to FIG. 5, the server may determine that the lane line 510 is double solid lines, which indicates that the lanes on either side of the lane line 510 have opposite directionality. Using this data, the server may infer a direction. For instance, if the lane 530 is determined to have west-bound directionality, the server then infers (using the double solid lane line 510) that the lanes 540 and 550 are east-bound.

Referring back to FIG. 7, at the step 730, the server may label the set of image data with the plurality of lane width values, the plurality of lane width values representing a width of a lane in which the at least one autonomous vehicle was positioned. Using the identified number of lanes (step 720). As discussed in the step 430 (FIG. 4) the server may label the data.

If the server has identified a direction associated with one or more lanes, then each lane may also include corresponding labeling data. For instance, the set of images may include a total number of lanes where each lane (e.g., the first lane from the left or the second lane from the right) is further labeled with direction data.

At the step 740, the server may train a machine learning model for predicting lane width using new image data. The server may use the methods and systems discussed herein, such as in the step 440 to train a machine-learning model.

FIG. 8 is a flowchart diagram of an example method of using machine learning models to predict a lane width value using real-time image data, according to an embodiment. The steps of the method 800 of FIG. 8 may be executed, for example, by an autonomous vehicle system, including the vehicle 102, the controller 300, or any other processor discussed herein, according to some embodiments. The method 800 shown in FIG. 8 comprises execution steps 810-820. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously with one another.

The method 800 of FIG. 8 is described as being performed by an autonomous vehicle system (e.g., the vehicle 102 and/or the controller 300). However, in some embodiments, one or more of the steps may be performed by a different processor(s) or any other computing device. For instance, one or more of the steps may be performed via a cloud-based service or another processor in communication with the processor of the autonomous vehicle and/or its autonomy system. Although the steps are shown in FIG. 8 as having a particular order, it is intended that the steps may be performed in any order. It is also intended that some of these steps may be optional.

At the step 810, the server may identify a set of image data indicative of a field of view from an autonomous vehicle. Similar in the step 610 (FIG. 6), the server may be in communication with one or more sensors of the vehicle. Using the sensors, the server may receive/retrieve a set of images. The images may correspond to the surroundings of the vehicle.

At step 820, the server may execute a trained machine-learning model to generate several lanes within a roadway. Using the trained machine learning model, the server may determine the total number of lanes for the roadway. In some embodiments, the server may also identify/predict the direction of each lane. For instance, the machine learning model may determine (using the ongoing traffic or using an HD map) may determine that the roadway includes one lane going westbound and two lanes going eastbound.

Using the methods 700 and 800, the server can collect and analyze image data received from a plurality of vehicles. Using the analyzed set of images, the server may train a machine learning model to ingest a new set of images (e.g., video feed or LiDAR sensor) from a new vehicle and predict a total number of lanes (or a directionality for at least one lane) for the roadway in which the new vehicle is located.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising:

identifying, by one or more processors coupled to non-transitory memory, a set of image data captured by at least one autonomous vehicle when the at least one autonomous vehicle was positioned in a lane of a roadway, and respective ground truth localization data of the at least one autonomous vehicle;

determining, by the one or more processors, a plurality of lane width values for the set of image data, the plurality of lane width values including a first lane width value of the lane in which the at least one autonomous vehicle was positioned and a second lane width value of a lane not being traveled by the at least one autonomous vehicle, determining the plurality of lane width values further comprising:

determining distances between i) lane lines of the lane in which the at least one autonomous vehicle was positioned and ii) the ground truth localization data of the at least one autonomous vehicle, wherein determining the distances further comprises:

generating one or more confidence values of one or more ground truth information sources; and selecting a ground truth information source of the ground truth localization data from the one or more ground truth information sources, based on the one or more confidence values;

determining the first lane width value, based on the determined distances and a width of the at least one autonomous vehicle; and determining the second lane width value by comparing distances of lane lines of the lane not being traveled by the at least one autonomous vehicle to a same object within the set of image data;

labeling, by the one or more processors, the set of image data with the plurality of lane width values; and training, by the one or more processors, using the labeled set of image data, a machine learning model, such that the machine learning model is configured to predict a new lane width value for a new lane as output.

2. The method of claim 1, wherein the plurality of lane width values is determined using an image recognition or image segmentation protocol.

3. The method of claim 1, wherein the ground truth localization data includes data derived from a high-definition (HD) map.

4. The method of claim 3, wherein a plurality of lane indications of the set of image data are defined at least in part as a feature on a raster layer of the high-definition (HD) map.

5. The method of claim 1, wherein the machine learning model comprises a plurality of neural network layers.

6. The method of claim 1, further comprising:

executing, by the one or more processors, the machine learning model for a second autonomous vehicle.

7. The method of claim 1, wherein the one or more ground truth localization sources are separate from the image data.

8. A non-transitory machine-readable storage medium having computer-executable instructions stored thereon that, when executed by one or more processors, cause the one or more processors to perform operations comprising:

identify a set of image data captured by at least one autonomous vehicle when the at least one autonomous vehicle was positioned in a lane of a roadway, and respective ground truth localization data of the at least one autonomous vehicle;

determine a plurality of lane width values for the set of image data, the plurality of lane width values including a first lane width value of the lane in which the at least one autonomous vehicle was positioned and a second lane width value of a lane not being traveled by the at least one autonomous vehicle, determine the plurality of lane width values further comprising:

determine distances between i) lane lines of the lane in which the at least one autonomous vehicle was positioned and ii) the ground truth localization data of the at least one autonomous vehicle, wherein determine the distances further comprises:

generate one or more confidence values of one or more ground truth information sources; and select a ground truth information source of the ground truth localization data from the one or more ground truth information sources, based on the one or more confidence values;

determine the first lane width value, based on the determined distances and a width of the at least one autonomous vehicle; and determine the second lane width value by comparing distances of lane lines of the lane not being traveled by the at least one autonomous vehicle to a same object within the set of image data, label the set of image data with the plurality of lane width values; and train, using the labeled set of image data, a machine learning model, such that the machine learning model is configured to predict a new lane width value for a new lane as output.

9. The non-transitory machine-readable storage medium of claim 8, wherein the plurality of lane width values is determined using an image recognition or image segmentation protocol.

10. The non-transitory machine-readable storage medium of claim 8, wherein the ground truth localization data includes data derived from a high-definition (HD) map.

11. The non-transitory machine-readable storage medium of claim 10, wherein a plurality of lane indications of the set of image data are defined at least in part as a feature on a raster layer of the high-definition (HD) map.

12. The non-transitory machine-readable storage medium of claim 8, wherein the machine learning model comprises a plurality of neural network layers.

13. The non-transitory machine-readable storage medium of claim 8, wherein the instructions further cause the one or more processors to:

executing, by the one or more processors, the machine learning model for a second autonomous vehicle.

14. The non-transitory machine-readable storage medium of claim 8, wherein the one or more ground truth localization sources are separate from the image data.

15. A system comprising a processor configured to:

identify a set of image data captured by at least one autonomous vehicle when the at least one autonomous vehicle was positioned in a lane of a roadway, and respective ground truth localization data of the at least one autonomous vehicle;

determine a plurality of lane width values for the set of image data, the plurality of lane width values including a first lane width value of the lane in which the at least one autonomous vehicle was positioned and a second lane width value of a lane not being traveled by the at least one autonomous vehicle, determine the plurality of lane width values further comprising:

determine distances between i) lane lines of the lane in which the at least one autonomous vehicle was positioned and ii) the ground truth localization data of the at least one autonomous vehicle, wherein determine the distances further comprises:

generate one or more confidence values of one or more ground truth information sources; and select a ground truth information source of the ground truth localization data from the one or more ground truth information sources, based on the one or more confidence values;

determine the first lane width value, based on the determined distances and a width of the at least one autonomous vehicle; and determine the second lane width value by comparing distances of lane lines of the lane not being traveled by the at least one autonomous vehicle to a same object within the set of image data, label the set of image data with the plurality of lane width values; and train, using the labeled set of image data, a machine learning model, such that the machine learning model is configured to predict a new lane width value for a new lane as output.

16. The system of claim 15, wherein the plurality of lane width values is determined using an image recognition or image segmentation protocol.

17. The system of claim 15, wherein the ground truth localization data includes data derived from a high-definition (HD) map.

18. The system of claim 17, wherein a plurality of lane indications of the set of image data are defined at least in part as a feature on a raster layer of the high-definition (HD) map.

19. The system of claim 15, wherein the processor is further configured to: execute the machine learning model for a second autonomous vehicle.

20. The system of claim 15, wherein the one or more ground truth localization sources are separate from the image data.

* * * * *